(12) United States Patent
Ahn et al.

(10) Patent No.: US 8,464,340 B2
(45) Date of Patent: Jun. 11, 2013

(54) SYSTEM, APPARATUS AND METHOD OF MALWARE DIAGNOSIS MECHANISM BASED ON IMMUNIZATION DATABASE

(75) Inventors: Tae Jin Ahn, Seoul (KR); Taejoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 862 days.

(21) Appl. No.: 12/038,378

(22) Filed: Feb. 27, 2008

(65) Prior Publication Data

US 2009/0064328 A1    Mar. 5, 2009

(30) Foreign Application Priority Data

Sep. 4, 2007  (KR) .......................... 10-2007-0089358

(51) Int. Cl.
*G06F 11/00*    (2006.01)
(52) U.S. Cl.
USPC ........................................................... 726/22
(58) Field of Classification Search
USPC ........................................................... 726/22
See application file for complete search history.

(56) References Cited

U.S. PATENT DOCUMENTS

| | | | | |
|---|---|---|---|---|
| 2005/0022011 A1* | 1/2005 | Swander et al. | ............... | 713/201 |
| 2006/0191006 A1* | 8/2006 | Satake et al. | .................... | 726/22 |
| 2007/0136808 A1* | 6/2007 | Xiong | ............................. | 726/22 |

FOREIGN PATENT DOCUMENTS

| | | |
|---|---|---|
| JP | 11102333 | 4/1999 |
| JP | 2003005989 | 1/2003 |
| JP | 2004252642 | 9/2004 |
| KR | 1020040004943 A | 1/2004 |
| KR | 1020070049514 A | 5/2007 |

* cited by examiner

*Primary Examiner* — Jacob Lipman
(74) *Attorney, Agent, or Firm* — Sughrue Mion, PLLC (57) ABSTRACT

An immunization system including: an immunization client apparatus which determines whether a target code is a malicious code by performing an immunization operation with respect to a first immunization signature and a code signature that is extracted from the target code and reports the result of the determination to an immunization server; and the immunization server which diagnoses whether the target code is the malicious code, updates a second immunization signature based on the reported result of the determination, and transmits to the immunization client apparatus an update message about the updated second immunization signature, wherein the immunization client apparatus updates the first immunization signature based on the received update message is provided.

9 Claims, 6 Drawing Sheets

SYSTEM, APPARATUS AND METHOD OF MALWARE DIAGNOSIS MECHANISM BASED ON IMMUNIZATION DATABASE

CROSS-REFERENCE TO RELATED APPLICATION

This application claims priority from Korean Patent Application No. 10-2007-0089358, filed on Sep. 4, 2007, in the Korean Intellectual Property Office, the entire disclosure of which is incorporated herein by reference.

BACKGROUND OF THE INVENTION

1. Field of the Invention

Methods and apparatuses consistent with the present invention relate to determining whether a target code is a malicious code, and more particularly, to an apparatus and method which can compare a code signature extracted from a target code with a malicious code immunization signature or a normal code immunization signature stored in an immunization database, and determine whether the target code is a malicious based on a result of the comparison.

2. Description of Related Art

In current information industry society, computers are being used in various fields of living, works, and the like. With the distribution of computers, malicious codes were also generated to result in behaviors that conflict with a user's intent. The malicious codes may cause malfunctions of computers, damage to data, and leakage of user information, or may be for crimes such as hacking. Specifically, the malicious codes may bring various types of damages. As the Internet becomes popular among users, the malicious codes have been also rapidly distributed. Therefore, computer users are aware that they must be careful about the malicious code.

Also, as hardware of a portable device is being improved and application programs to be executed in the portable device are being diversified and becoming more complex, malicious code that usually attack computers may cause serious damage even in the portable device. In particular, with proliferation of portable Internet services, such as wireless Internet services and the like, various types of malicious codes may cause malfunctions of the portable device, delete data, leak user information, and the like. Examples of the malicious codes include malicious codes that attack a vulnerability of existing computer application programs and mobile malwares that attack a vulnerability of services and application programs of the portable device such as Bluetooth, a Multimedia Messaging system (MMS), and the like.

A known malicious code detection method may include a signature-based detection method. The malicious code detection method makes signatures of a known virus for inclusion into a database, stores the signatures in a memory, compares input data with the database, and detects a matched signature and thereby detects the malicious code. The signature is a characteristic pattern of the virus. As a number of known malicious codes increases, the size of the database storing signatures is also enlarged. In this case, there occur problems such as overhead of a central processing unit (CPU), overhead of memory, and limiting power consumption when power is limited such as in a portable device.

When a new malicious code appears, a computer employing the above technology may have difficulty in detecting the new malicious before the new malicious code is reported in an updated database. In addition, a large number of computers may be exposed to dangers of the malicious code until the computers cope with the malicious code after the spreading thereof Protecting a computer from malicious codes to enable the computer to perform normal functions may be similar to that of an immune system of a human body which protects the human body from viruses or microorganisms. Some researchers studying computer viruses or malicious codes have shared their feelings about the similarity between computer viruses and viruses of the human body, and attempted to introduce a mechanism that models the immunity system of the human body. A representative example may include research results that were obtained from an IBM anti-virus research team. They concentrated on the mechanism in which the immune system gives warning to neighboring cells against infection when the immune system detects the infection. They focused on realization of a function to prevent an spread of a virus when a computer is infected with the virus and a malfunction occurs.

SUMMARY OF THE INVENTION

An aspect of the present invention provides an apparatus and method which can protect a computer from a malicious code. Specifically, an aspect of the present invention provides an apparatus and method which can diagnose whether even an unknown new malicious code is a malicious code by comparing the signature of binary values of the new malicious code with the signature of a known malicious code and the signature of a known normal code.

An aspect of the present invention also provides an apparatus and method which can maintain diagnostic capability of an immunization database for detecting a malicious code and also maintain the size of the immunization database to be small.

An aspect of the present invention also provides an apparatus and method which can reduce the size of an immunization database and thereby can reduce an operation time spent to diagnose a malicious code. The immunization database stores at least one immunization signature for determination of the malicious code.

An aspect of the present invention also provides an apparatus and method which can assign an individual difference for each immunization client apparatus or each group including the immunization client apparatus, and thereby enables at least one portion of a plurality of immunization client apparatuses to detect a new malicious code without being damaged by the new malicious code even though the plurality of immunization client apparatuses is exposed to the new malicious code.

According to an aspect of the present invention, there is provided an immunization client apparatus including: a filter database which stores at least one filter; a filtering unit which extracts a code signature from a target code using the at least one filter; an immunization database which stores at least one immunization signature; and a diagnostic unit which performs an immunization operation with respect to the extracted code signature and diagnoses whether the target code is a malicious code based on the result of the immunization operation.

According to another aspect of the present invention, there is provided an immunization server including: a common immunization storage unit which stores at least one immunization signature; a receiver which receives a diagnostic request message of a target code from an immunization client apparatus; a common filtering unit which extracts a code signature from the target code; a common diagnostic unit which diagnoses whether the target code is malicious based on the stored at least one immunization signature; an updating unit which updates the common immunization storage unit based on the result of the diagnosis and generates an update instruction message; and an instruction unit which transfers the update instruction message to the immunization client apparatus.

According to still another aspect of the present invention, there is provided an immunization system including: an immunization client apparatus which determines whether a target code is a malicious code by performing an immunization operation with respect to a first immunization signature and a code signature that is extracted from the target code and reports the result of the determination to an immunization server; and the immunization server which diagnoses whether the target code is the malicious code, updates a second immunization signature based on the reported result of the determination, and transmits to the immunization client apparatus an update message about the updated second immunization signature, wherein the immunization client apparatus updates the first immunization signature based on the received update message.

According to yet another aspect of the present invention, there is provided a method of diagnosing a malicious code, the method including: extracting a code signature from a target code using at least one filter; and diagnosing whether the target code is the malicious code by performing an immunization operation with respect to the extracted code signature and an immunization signature.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

According to an exemplary embodiment of the present invention, there is provided an immunization client apparatus including: a filter database which stores at least one filter; a filtering unit which extracts a code signature from a target code using the at least one filter; an immunization database which stores at least one immunization signature wherein an immunization operation is performed with respect to the at least one immunization signature and the extracted code signature; and a diagnostic unit which performs an immunization operation with respect to the extracted code signature and diagnoses whether the target code is a malicious code based on the result of the immunization operation.

Hereinafter, exemplary embodiments of the present invention will be described with reference to the accompanying drawings, however the present invention is not limited or restricted by the embodiments.

Figure 1:
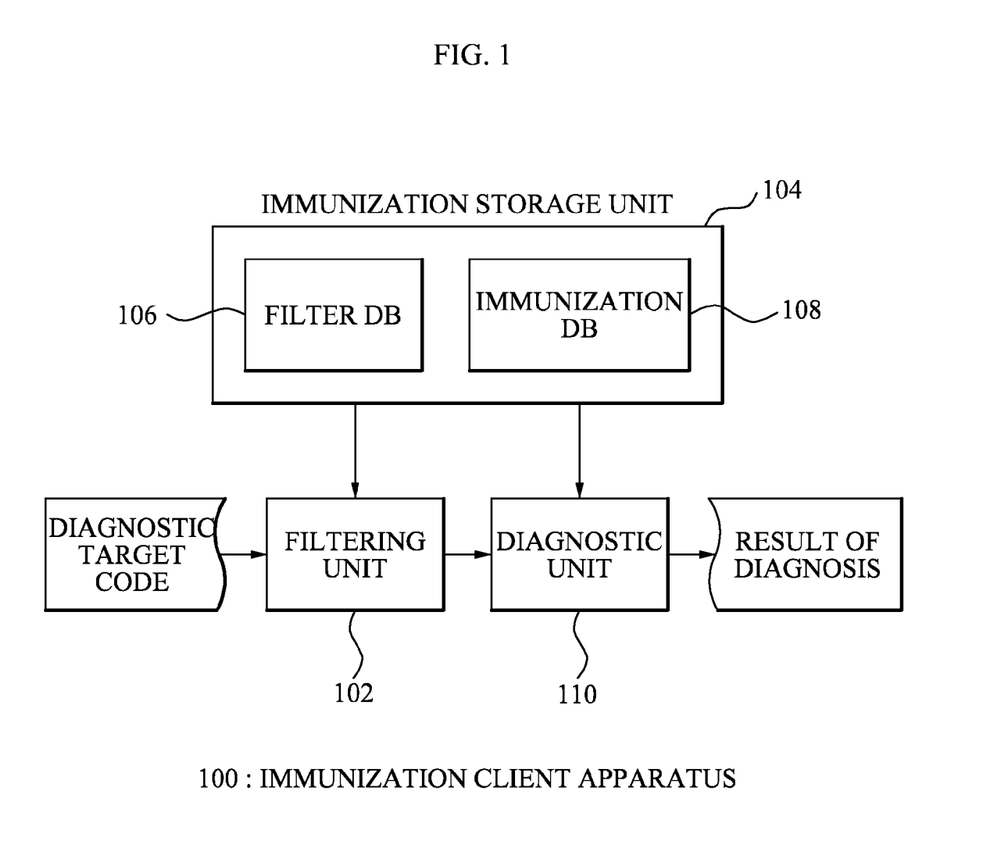
FIG. 1 is a block diagram illustrating an immunization client apparatus according to an exemplary embodiment of the present invention.

FIG. 1 is a block diagram illustrating an immunization client apparatus 100 according to an exemplary embodiment of the present invention. Referrng to FIG. 1, the immunization client apparatus 100 includes a filtering unit 102, an immunization storage unit 104, and a diagnostic unit 110.

The immunization storage unit 104 includes a filter database 106 and an immunization database 108. The immunization database 108 may include a malicious code immunization database which stores a malicious code immunization signature or a normal code immunization database which stores a normal code immunization signature. The filter database 106 includes a filter element. The filter element is unique for each immunization client apparatus or each immunization client apparatus group. The immunization database 108 is unique for each immunization client apparatus 100. The immunization storage unit 104 may include a different immunization database for each immunization client apparatus or each immunization client apparatus group. Therefore, although an immunization operation is performed with respect to the same target code, a different result value may be obtained. Also, although diagnosis is performed for the same malicious code that is still unknown, some immunization client apparatuses may detect the malicious code whereas other immunization client apparatuses may be infected with the malicious code.

An immunization server may diagnose a particular target code as malicious and receive information about the particular target code from an immunization client apparatus that is not infected with the particular target code. The immunization server may transmit the received information to any immunization client apparatus capable of receiving an update message from the immunization server and thereby prevent all immunization client apparatuses from being infected with the particular target code.

The immunization database 108 of the immunization storage unit 104 may include a malicious code immunization database or a normal code immunization database. The malicious code immunization database stores a malicious code immunization signature. An immunization operation can be performed with respect to the malicious code immunization signature and a code signature of a malicious code to output the result of the immunization operation which is greater than a first reference value. The normal code immunization database stores a normal code immunization signature. An immunization operation can be performed with respect to the normal code immunization signature and a code signature of a normal code to output the result of the immunization operation which is greater than or equal to a second reference value. The first reference value and the second reference value are predetermined.

The filtering unit 102 extracts information from a target code using the filter database 106. The target code denotes a binary code that can be executed in a particular operating system (OS). In the case of Windows 32 (Win32), a target code consisting of binary data is generally less than or equal to 3 MB. All the portions of the target code may not be needed for diagnosis of a malicious code. Therefore, the filtering unit 102 performs a filtering process to obtain only a necessary portion. Filtering is a process of extracting from the binary data only a portion that satisfies a predetermined criterion. The criterion is stored in the filter database 106 of the immunization storage unit 104.

The term "filter" used herein defines a pattern of binary data corresponding to the malicious code among target codes. The filter may be classified into a filter that is more frequently found from malicious codes and a filter that is more frequently found from normal codes. For example, among groups of bytes where each group consists of six bytes, a pattern of which a third byte is −100 and a fifth byte is 24 is a filter. In the present invention, two types of filters are embodied into a database.

The two types of filters include one filter that is more frequently found from malicious codes but less frequently found from normal codes, and another filter that is more frequently found from the normal codes but less frequently found from the malicious codes. Each of the immunization client apparatus may use a combination of filters to diagnosis the malicious codes. And the combinations of filters may be different to each other. Due to the above features, a malicious code may avoid a malicious code diagnosis and thus infect some immunization client apparatuses, whereas the malicious code may be diagnosed as the malicious code in other immunization client apparatuses, preventing infection of the other immunization client apparatuses. If immunization client apparatuses that belong to a prevention group for a known malicious code consistently diagnose the malicious code as the known malicious code or a normal code, the immunization client apparatuses may be subject to infection damages by the other malicious code such as a new or variant virus.

According to the present invention, immunization client apparatuses that are included in a prevention group of infectious viruses may have unique individual differences. In this case, some immunization client apparatuses may perform diagnosis against the other malicious code such as the new or the variant virus and thus may avoid damage. The immunization client apparatuses that successfully diagnosed the malicious code may give a warning or a diagnosis method to other immunization client apparatuses that are not infected with the malicious code. Through the above process, it is possible to take preventive measure against an occurrence of a malicious code such as a new or variant virus.

Figure 2:
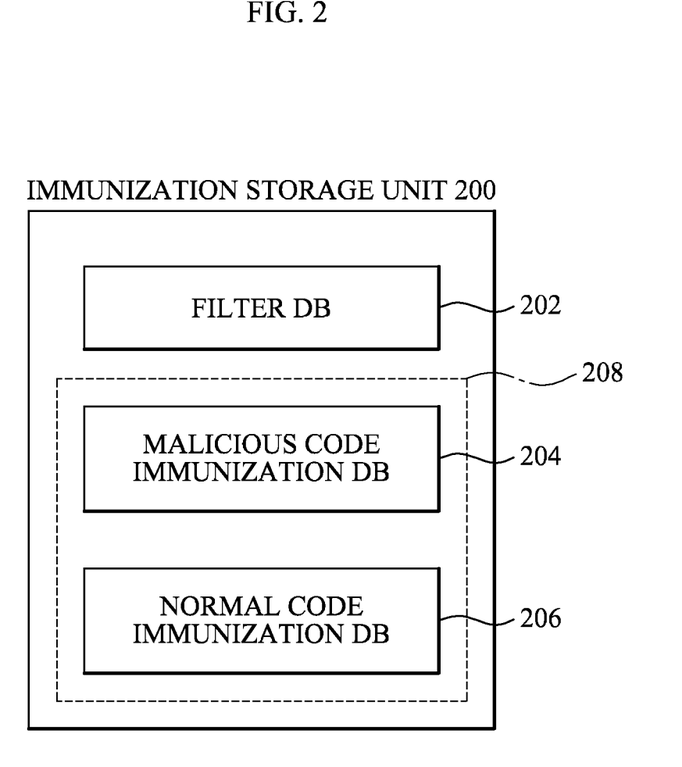
FIG. 2 is a block diagram illustrating an immunization storage unit of an immunization client apparatus according to an exemplary embodiment of the present invention.

FIG. 2 is a block diagram illustrating an immunization storage unit 200 of an immunization client apparatus according to an exemplary embodiment of the present invention. Referring to FIG. 2, the immunization storage unit 200 includes a filter database 202 and an immunization signature database 208. The immunization signature database 208 includes a malicious code immunization database 204 and a normal code immunization database 206.

The filter database 202 stores at last one filter. The filter is used to extract a code signature from a target code.

An immunization operation is performed to each of binary sequences (hereinafter, code signatures) and each of at least one immunization signature that is stored in the malicious code immunization database 204 and the normal code immunization database 206. The code signatures are extracted from the target code via a filtering unit.

A malicious code immunization signature that is stored in the malicious code immunization database 204 denotes an immunization signature that has a relatively higher probability of outputting a result of immunization operation, which is greater than a first threshold value in the immunization operation, with the code signature of the malicious code. All the results of the immunization operation with respect to all the code signatures of malicious codes and the malicious code immunization signature may not be greater than or equal to the first threshold value. However, when the immunization operation is performed with respect to the plurality of malicious code immunization signatures and the code signature, at least one result of the immunization operation is determined to be greater than or equal to the first threshold value.

A normal code immunization signature that is stored in the normal code immunization database 206 denotes an immunization signature that has a relatively higher probability of outputting the result of immunization operation, which is greater than or equal to a second threshold value in the immunization operation with the code signature of the normal code. All the results of the immunization operation with respect to all the code signatures of normal codes and the normal code immunization signature may not be greater than or equal to the second threshold value. However, when the immunization operation is performed with respect to the plurality of normal code immunization signatures and the code signature, at least one result of the operation is determined to be greater than or equal to the second threshold value.

Figure 3:
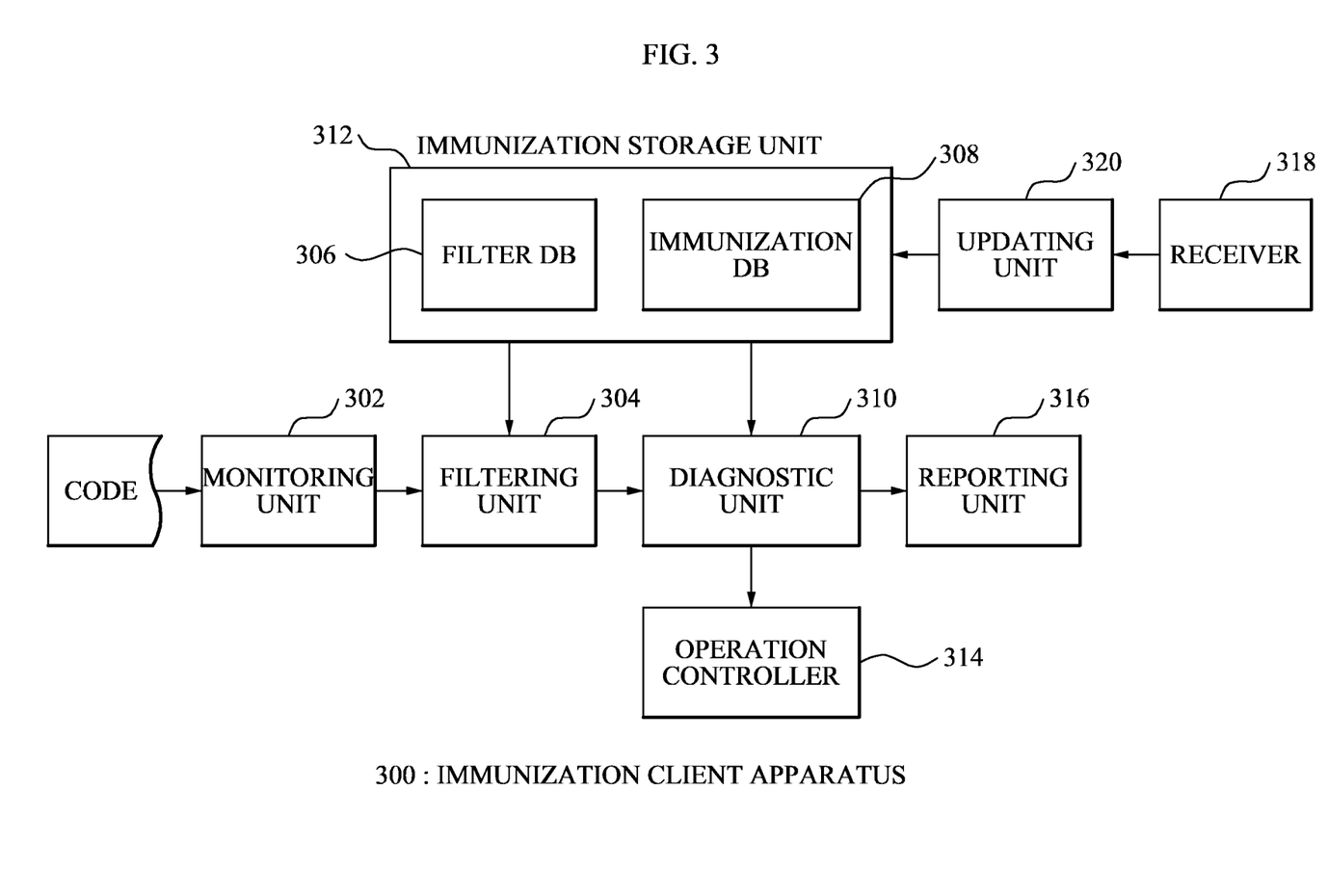
FIG. 3 is a block diagram illustrating an immunization client apparatus according to an exemplary embodiment of the present invention.

FIG. 3 is a block diagram illustrating an immunization client apparatus 300 according to an exemplary embodiment of the present invention. Referring to FIG. 3, the immunization client apparatus 300 includes a monitoring unit 302, a filtering unit 304, a diagnostic unit 310, an immunization storage unit 312, an operation controller 314, a reporting unit 316, a receiver 318, and an updating unit 320.

The monitoring unit 302 functions to select a target code and process the selected target code. In the case of a malicious code in a format of Win32, computers may be infected with the malicious code through networking between the computers using emails, websites, peer to peer (P2P) networks, file copying, file sharing, Bluetooth, and the like, or various types of interfacing methods. The monitoring unit 302 monitors an intrusion attempt of a file in the above paths and determines whether the intrusion attempt is malicious.

Also, the monitoring unit 302 may monitor a known symptom of a malicious code and thereby designate as a diagnostic target a cause code that causes the symptom. A representative symptom of the malicious code in the format of Win32 includes an access modulation, access to a restricted memory, generation of a copy version, access to a network, increase in traffic, and the like.

The monitoring unit 302 selects a malicious code detection target and performs a necessary pre-process. The malicious code in the format of Win32 may exist in a form of a single file, be parasitic on a file, exist in a memory, or exist as a network packet. Also, the monitoring unit 302 functions to collect suspicious codes from various types of intrusion paths in a possible form for a malicious code detection. In this case, as necessary, the monitoring unit 302 decompresses, performs code normalization, and the like.

The filtering unit 304 extracts a code signature from the target code.

According to an exemplary embodiment of the present invention, the filtering unit 304 may extract as the code signature a character string that is located in a particular location of the target code.

According to an exemplary embodiment of the present invention, the filtering unit 304 may extract as the code signature of the target code a character string corresponding to each malicious code to be diagnosed among target codes.

When the character string that corresponds to the malicious code to be diagnosed and that is located in the particular location is extracted as the code signature of the target code, an accurate code signature may not be extracted with respect to a variant of the malicious code that has a deliberate change in the particular location. The code signature may exist in another location, instead of the particular location. The filtering unit 304 may include at least one filter that includes a character string pattern corresponding to the malicious code being diagnosed, and may extract the character string pattern as the code signature of the target code.

Various types of malicious codes may be diagnosed by the filtering unit 304. The filtering unit 304 may extract as the code signature of the target code character strings corresponding to malicious codes. The filtering unit 304 may search the entire target codes for a predetermined character string. When the character string corresponding to the malicious code is found as a result of the search, the filtering unit 304 may extract the found character string as the code signature of the target code.

The diagnostic unit 310 compares the extracted code signature and at least one immunization signature, and diagnoses whether the target code is the malicious code based on the result of the comparison. According to an exemplary embodiment of the present invention, the diagnostic unit 310 may calculate a Euclidean distance between a target code and a malicious code or a normal code which is included in an immunization database, and perform an immunization operation.

The Euclidean distance z between two extracted code signature x and y is calculated by $$z = \sqrt{\sum_{i=1}^{N}(x_i - y_i)^2}$$ [Equation 1]

where N denotes the length of code signature vectors x and y (which is from immunization database), vector x contains extracted code signature from target code, vector y contains code signature from immunization database. Both signature are same length so x and y have the same vector size. $x_i$ denotes an $i^{th}$ element of the code signature which is contained by vector x, and $y_i$ denotes an $i^{th}$ element of the code signature which is contained by vector y.

If the code signature vector x is x=[a, b, c] and the code signature vector y is y=[d, e, f], the Euclidean distance z between the code signature x and y is calculated by $$z = \sqrt{(a-d)^2 + (b-e)^2 + (c-f)^2}$$

The immunization storage unit 312 includes the filter database 306 which stores at least one filter for extracting the code signature. The filtering unit 304 extracts the code signature from the target code using the at least one filter. The stored filter includes a different combination of filters for each immunization client apparatus, and individually determines a character string to be extracted as the code signature based on the combination.

According to an exemplary embodiment of the present invention, at least one immunization signature that is stored in the filter database 306 may be different for each immunization client apparatus. The diagnostic unit 310 may diagnose whether the target code is the malicious code using the immunization signature that includes a different combination for each immunization client apparatus.

The immunization storage unit 312 may include an immunization database 308 which stores at least one immunization signature. An immunization operation is performed with respect to the at least one immunization signature and the code signature of the target code. The at least one immunization signature may include a normal code immunization signature or a malicious code immunization signature.

According to an exemplary embodiment of the present invention, when at least one result of comparison between the code signature and the at least one normal code immunization signature is greater than or equal to a first threshold value, and all the results of comparison between the code signature and the at least one malicious code immunization signature is less than a second threshold value, the diagnostic unit 310 may diagnose the target code as a normal code.

According to an exemplary embodiment of the present invention, when all the results of comparison between the code signature and the at least one normal code immunization signature is less than the first threshold value, and at least one result of the comparison between the code signature and the at least one malicious code immunization signature is greater than or equal to the second threshold value, the diagnostic unit 310 may diagnose the target code as a malicious code.

According to an exemplary embodiment of the present invention, when at least one result of comparison between the code signature and the at least one normal code immunization signature is greater than or equal to the first threshold value, and at least one result of comparison between the code signature and the at least one malicious code immunization signature is greater than or equal to the second threshold value, the diagnostic unit 310 diagnoses the target code as a malicious code based on a similarity degree between the target code and a known malicious code or a known normal code.

The operation controller 314 controls an operation of the target code based on the result of the diagnosis. The operation controller 314 may execute at least one of performing, stopping, and deletion of the target code.

The reporting unit 316 may transmit the result of the diagnosis to an immunization server via a network.

According to an exemplary embodiment of the present invention, when at least one result of comparison between the code signature and the at least one normal code immunization signature is greater than or equal to the first threshold value, and at least one result of comparison between the code signature and the at least one malicious code immunization signature is greater than or equal to the second threshold value, the reporting unit 316 may transmit the target code to the immunization server.

The receiver 318 receives an update instruction message for the filter database 306 or the immunization database 308 from the immunization server. When an update is needed, the receiver 318 receives the update instruction message via an external network.

The updating unit 320 updates the filter database 306 and the immunization database 308 based on the received update instruction message.

According to an exemplary embodiment of the present invention, the immunization storage unit 312 may include the immunization database 308 which stores at least one immunization signature, and the receiver 318 may receive a second immunization signature from the immunization server that stores the second immunization signature. The updating unit 320 may update the stored at least one immunization database 308 based on the received second immunization signature.

The immunization client apparatus 300 may receive from the immunization server the second immunization signature capable of diagnosing a new malicious code, and diagnose whether the new code is a malicious code.

According to an exemplary embodiment of the present invention, the immunization storage unit 312 may include the filter database 306 which stores at least one filter, and the receiver 318 may receive a second filter from the immunization server that stores the second filter. The updating unit 320 may update the filter database 306 based on the received second filter.

By using the second filter, the immunization client apparatus 300 may perform a malicious code diagnosis even with respect to a code that cannot be diagnosed using the existing stored filter.

Figure 4:
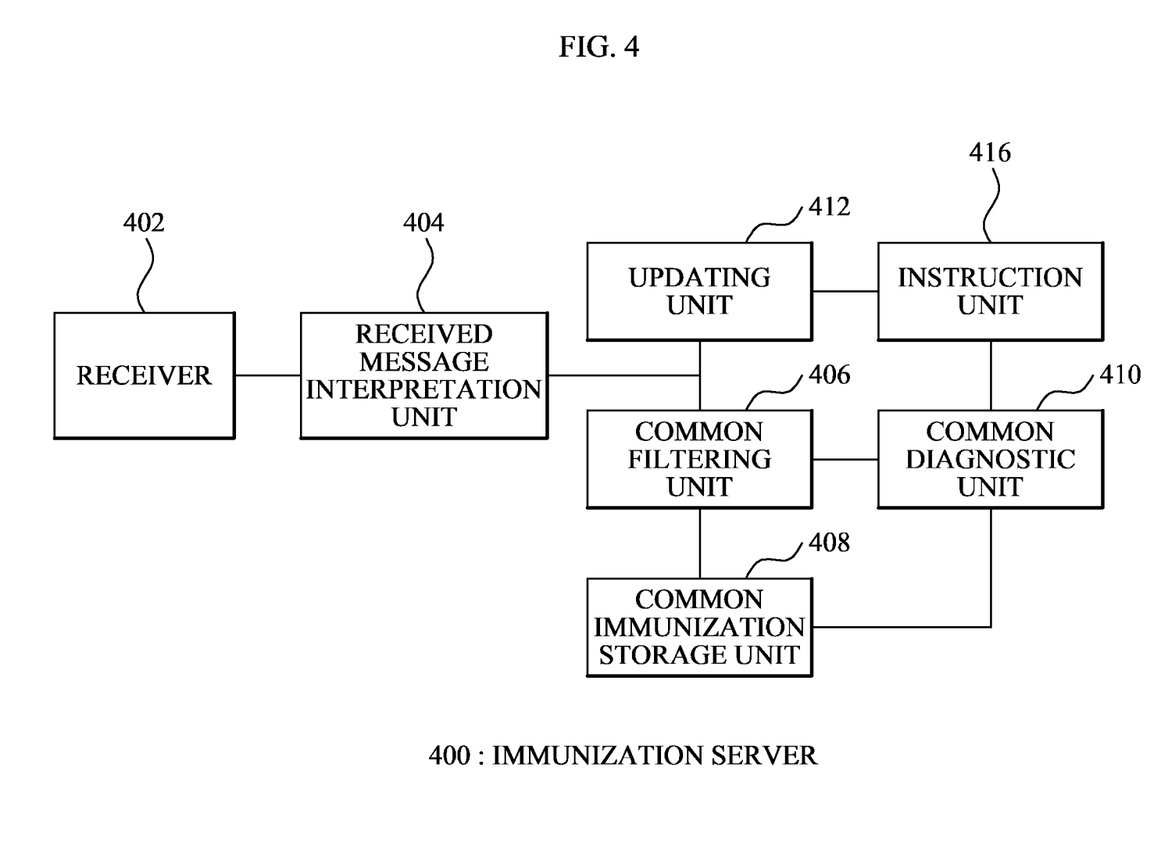
FIG. 4 is a block diagram illustrating an immunization server according to an exemplary embodiment of the present invention.

FIG. 4 is a block diagram illustrating an immunization server 400 according to an exemplary embodiment of the present invention. Referring to FIG. 4, the immunization server 400 includes a receiver 402, a received message interpretation unit 404, a common filtering unit 406, a common immunization storage unit 408, a common diagnostic unit 410, an updating unit 412, and an instruction unit 416.

The common immunization storage unit 408 includes an immunization database which stores at least one immunization signature. An immunization operation is performed with respect to the at least one immunization signature and a code signature of a target code. The common immunization storage unit 408 may include a malicious code immunization signature database which stores information about a known malicious code, or a normal code immunization signature database which stores information about the known normal code.

The receiver 402 receives from an immunization client apparatus a diagnostic request message of a target code, the target code, or a result of diagnosis thereof The received message interpretation unit 404 interprets the received diagnostic request message.

According to an exemplary embodiment of the present invention, the receiver 402 may request the immunization client apparatus for the target code based on the diagnostic request message. In response to the request, the immunization client apparatus may transmit the target code, and the updating unit 412 may update the common immunization storage unit 408 based on the received target code. Also, the immunization client apparatus may encrypt the target code and transmit the encrypted target code to the receiver 402.

The common filtering unit 406 extracts a code signature from the target code using at least one filter.

The common immunization storage unit 408 may include at least one of a common filter database, a malicious code immunization signature database, and a normal code immunization signature database. The common filter database stores at least one filter which is used to extract the code signature of the target code. The malicious code immunization signature database stores at least one malicious code immunization signature. An immunization operation is performed with respect to the at least one malicious code immunization signature and a code signature of a malicious code to output the result of the immunization operation which is greater than or equal to a first reference value. The normal code immunization signature database stores at least one normal code immunization signature. An immune operation is performed with respect to the at least one normal code immunization signature and a code signature of a normal code to output the result of the immunization operation which is greater than or equal to a second reference value.

According to an exemplary embodiment of the present invention, the common immunization storage unit 408 may further include a database for signature-based diagnoses of a malicious code. The common diagnostic unit 410 may perform the signature-based diagnoses of the malicious code.

The signature-based diagnoses of the malicious code extract the signature of a known malicious code and determine whether the target code is the malicious code based on whether the extracted signature is included in the target code. According to an exemplary embodiment of the present invention, the signature-based database for diagnoses of the malicious code stores at least one signature that is extracted from at least one malicious code. When the stored at least one signature is included in the target code, the common diagnostic unit 410 diagnoses the target code as the malicious code.

The common diagnostic unit 410 may diagnose whether the target code is malicious by using the common filter database, the malicious code immunization database, and the normal code immunization signature database, and also performs the signature-based diagnoses of the malicious code. Therefore, even in the case of a target code that cannot be determined as a malicious code or a normal code, the immunization client apparatus may more accurately determine whether the target code is the malicious code.

The common diagnostic unit 410 diagnoses whether the target code is the malicious code by referring to the extracted code signature and at least one immunization signature.

The updating unit 412 updates the common immunization storage unit 408 based on the result of the diagnosis for the received target code, and generates an update instruction message.

According to an exemplary embodiment of the present invention, the common diagnostic unit 410 may perform an immunization operation with respect to the code signature of the target code and the malicious code immunization signature or the normal code immunization signature. The updating unit 412 may delete a portion of the malicious code immunization signature or the normal code immunization signature based on the result of the immunization operation.

The updating unit 412 may update the common immunization storage unit 408 based on the result of the diagnosis that is received from the immunization client apparatus.

The instruction unit 416 transmits the generated update instruction message to all the immunization client apparatuses capable of communicating with the immunization server 400. The immunization client apparatuses that receive the update instruction message may update their immunization database based on the received update instruction message.

According to an exemplary embodiment of the present invention, the common immunization storage unit 408 may include a common filter database which stores at least one filter and an immunization signature database which stores at least one immunization signature. The common filtering unit 406 may extract a code signature from a target code received by the receiver 402 using the stored at least one filter. The common diagnostic unit 410 may calculate at least one distance between the extracted code signature and the at least one immunization signature. The calculated distance may be a Euclidian distance between the code signature and the immunization signature. The updating unit 412 may update the common immunization storage unit 408 based on the at least one calculated distance.

If a new malicious code appears, the updating unit 412 may add a new immunization signature to the immunization signature database and thereby update the common immunization storage unit 408. The added immunization signature may diagnose the new malicious code.

According to an exemplary embodiment of the present invention, the updating unit 412 may delete an immunization signature of which the calculated distance is greater than or equal to a predetermined threshold value, among the at least one immunization signature. The updating unit 412 may delete some immunization signatures and thereby prevent the size of the immunization signature database from continuously increasing due to the new malicious code.

According to an exemplary embodiment of the present invention, the common immunization storage unit 408 may again save the immunization signature by considering the immunization target code when a ratio of distances that are greater than or equal to predetermined threshold distance to the at least one calculated distance between a code signature and a target code, is greater than or equal to predetermined threshold ratio. According to an exemplary embodiment of the present invention the common immunization storage unit 408 may control its size by controlling the number of immunization signature code to remove. When certain immunization target code shows higher value than threshold, every immunization signature code which shows higher value than threshold will be removed from common immunization storage unit 408. However, if all the immunization signatures are deleted, the malicious code diagnosis may not be normally performed. Therefore in this case, the entire immunization signature may be reconstructed based on the target code. In this case, when to rebuild the whole immunization storage unit 408 can be decided by threshold ratio. The ratio can be defined as the number of immunization signature to be deleted/the number of immunization signature in the storage unit 408.

Figure 5:
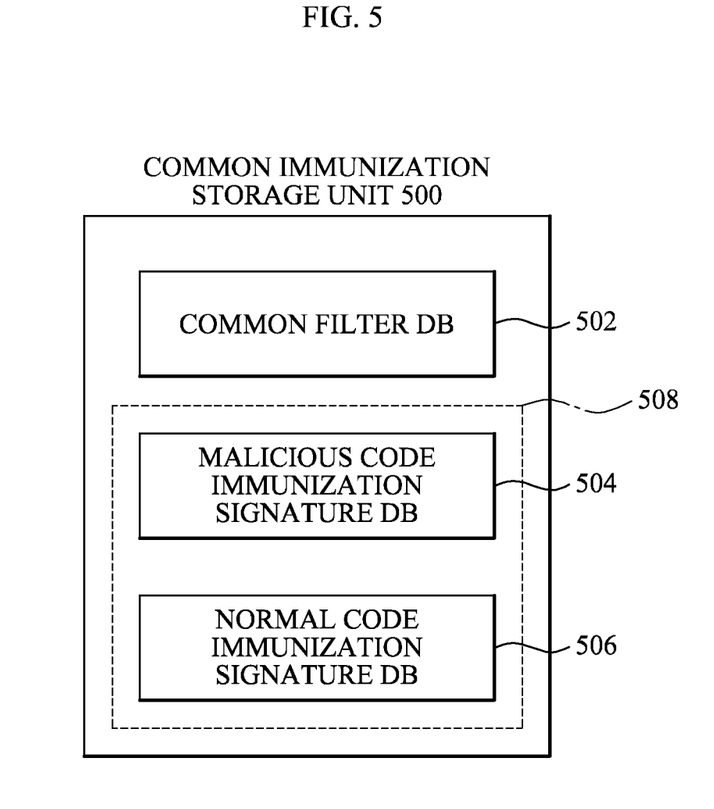
FIG. 5 is a block diagram illustrating a common immunization storage unit of an immunization server according to an exemplary embodiment of the present invention.

FIG. 5 is a block diagram illustrating a common immunization storage unit 500 of an immunization server according to an exemplary embodiment of the present invention. Referring to FIG. 5, the common immunization storage unit 500 includes a common filter database 502 and an immunization signature database 508. The immunization signature database 508 includes a malicious code immunization signature database 504 and a normal code immunization signature database 506.

The common filter database 502 stores at least one filter that is collected from all the immunization client apparatuses capable of communicating with the immunization server. Each of the immunization client apparatuses may diagnose whether a target code is a malicious code using only a portion of the stored at least one filter, whereas the immunization server performs the diagnosis by using all the filters. Therefore, the diagnosis may be more accurately performed.

The malicious immunization signature database 504 stores a malicious code immunization signature that has the highest probability to output a result of immunization operation which is greater than or equal to a first threshold value in the immunization operation with the code signature of the malicious code. All the results of the immunization operation with respect to all the malicious code immunization signatures may not be greater than or equal to the first threshold value. However, the immunization operation may be performed with respect to each of a plurality of malicious code immunization signatures. In this case, at least one result of the immunization operation may be greater than or equal to the first threshold value.

The malicious code immunization signature database 504 may store at least one malicious code immunization signature that is collected from all the immunization client apparatuses capable of communicating with the immunization server. Each of the immunization client apparatuses may diagnose whether a target code is a malicious code using only a portion of the stored at least one malicious code immunization signature, whereas the immunization server performs the diagnosis by using all the malicious code immunization signatures. Therefore, the diagnosis may be more accurately performed.

The normal code immunization signature database 506 stores a normal code signature that has the highest probability of outputting a result of immunization operation which is greater than or equal to a second threshold value in the immunization operation with the code signature of the normal code. All the results of the immunization operation with respect to all the normal code signatures may not be greater than or equal to the second threshold value. However, the immunization operation may be performed with respect to the immunization signature of the normal code and a plurality of normal code immunization signatures. In this case, at least one result of the immunization operation may be greater than or equal to the second threshold value.

The normal code immunization signature database 506 may store at least one normal code immunization signature that is collected from all the immunization client apparatuses capable of communicating with the immunization server. Each of the immunization client apparatuses may diagnose whether a target code is a malicious code using only a portion of the stored at least one normal code immunization signature, whereas the immunization server performs the diagnosis by using all the malicious code immunization signatures. The diagnosis may be more accurately performed.

Figure 6:
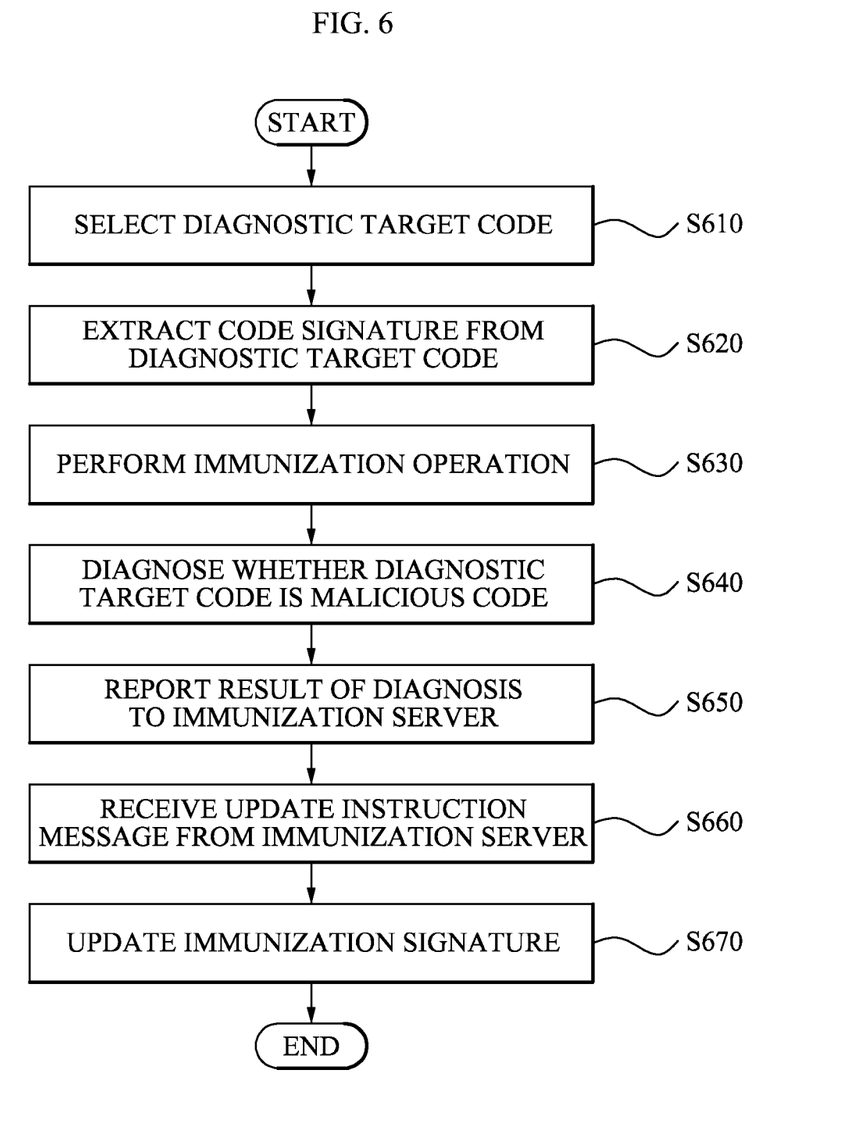
FIG. 6 is a flowchart illustrating a method of diagnosing a malicious code according to an exemplary embodiment of the present invention.

FIG. 6 is a flowchart illustrating a method of diagnosing a malicious code according to an exemplary embodiment of the present invention. Hereinafter, a diagnosis process of the malicious code will be described in detail with reference to FIG. 6.

In operation S610, a code suspected as a malicious code is selected as a target code from the entire execution codes.

In operation S620, a code signature is extracted from the target code using at least one filter.

In operation S630, an immunization operation is performed with respect to the extracted code signature and an immunization signature.

According to an exemplary embodiment of the present invention, the immunization operation may be to calculate a Euclidian distance between the extracted code signature and the immunization signature.

In operation S640, the target code is diagnosed as the malicious code depending on the result of the immunization operation.

According to an exemplary embodiment of the present invention, the immunization operation may be to calculate a Euclidian distance between the code signature of the target code and the immunization signature.

In operation S650, the result of the diagnosis is reported to an immunization server.

According to an exemplary embodiment of the present invention, when it is unclear whether the target code is malicious or normal, the target code may be transmitted to the immunization server.

In operation S660, an update instruction message is received from the immunization server.

In operation S670, the immunization signature is updated based on the received update instruction message.

According to an exemplary embodiment of the present invention, an immunization system may include an immunization client apparatus and the immunization server. The immunization client apparatus determines whether a target code is a malicious code by performing an immunization operation with respect to a first immunization signature and a code signature that is extracted from the target code and reports the result of the determination to an immunization server. The immunization server diagnoses whether the target code is the malicious code, updates a second immunization signature based on the reported result of the determination, and transmits to the immunization client apparatus an update message about the updated second immunization signature, According to the present invention, it is possible to improve a success rate of diagnoses of a malicious code by using a malicious code immunization database or a normal code immunization database for an immunization operation. The malicious code immunization database stores a malicious code immunization signature. An immunization operation can be performed with respect to the malicious code immunization signature and a code signature of the malicious code to output the result of the immunization operation which is greater than or equal to a first reference value. The normal code immunization database stores a normal code immunization signature. An immunization operation can be performed with respect to the normal code immunization signature and a code signature of a normal code to output the result of the immunization operation which is greater than or equal to a second reference value.

According to the present invention, a filter database for extracting a code signature, a malicious code immunization signature database, or a normal code immunization signature database is assigned for each immunization client apparatus or each group thereof so that the each immunization client apparatus may have a unique signature. Therefore, it is possible to prevent all the immunization client apparatuses from being equally infected with an unknown malicious code.

According to the present invention, it is possible to improve the diagnostic performance for a malicious code even in a portable device such as a notebook computer, a personal digital assistant (PDA), and a mobile phone, where a power supply is limited and a network is provided.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An immunization client comprising:
    an immunization storage unit including a filter database which stores at least one filter and an immunization signature database including a malicious code immunization database storing a malicious code immunization signature, and a normal code immunization database storing a normal code immunization signature;
    a filtering unit which extracts a code signature from a target code using the at least one filter; and
    a diagnostic unit which performs an immunization operation with respect to the extracted code signature from the target code by comparing the extracted code signature with the malicious code immunization signature and with the normal code immunization signature and diagnoses, in a diagnosis, the target code to determine whether the target code is a malicious code based on a result of the comparison.

2. The apparatus of claim 1, wherein the filter database includes a combination of filters that is unique for the client or a group including the client.

3. The apparatus of claim 1, wherein the immunization operation includes an immunization operation for the malicious code immunization signature and an immunization operation for the normal code immunization signature, and
    the diagnostic unit determines whether the target code is the malicious code by comparing a result of the immunization operation for the malicious code immunization signature with a first reference value, and comparing a result of the immunization operation for the normal code immunization signature with a second reference value.

4. The apparatus of claim 1, further comprising:
    a monitoring unit which selects the target code that is input into the filtering unit.

5. The apparatus of claim 1, further comprising:
    a controller which controls an operation of the target code based on a result of the diagnosis.

6. The apparatus of claim 5, wherein the controller executes at least one of performing, stopping, and deleting the target code.

7. The apparatus of claim 1, further comprising:
    a reporting unit which reports a result of the diagnosis to a server.

8. The apparatus of claim 1, further comprising:
    a receiver which receives an update for the filter database or the immunization signature database, from a server.

9. The apparatus of claim 8, further comprising:
    an updating unit which updates the filter database or the immunization signature database based on the update.

* * * * *